July 1, 1947.  E. MARTIN  2,423,246

METHOD OF MAKING BEARING BUSHING ON MOLDED BLADES

Filed June 14, 1944

Erle Martin
INVENTOR.

BY John C. Kerr
ATTORNEY

Patented July 1, 1947

2,423,246

UNITED STATES PATENT OFFICE 2,423,246

METHOD OF MAKING BEARING BUSHINGS ON MOLDED BLADES

Erle Martin, West Hartford, Conn., assignor to United Aircraft Corporation, East Hartford, Conn., a corporation of Delaware Application June 14, 1944, Serial No. 540,296

4 Claims. (Cl. 18—55)

This invention relates to variable pitch aircraft propellers made of plastic or other moldable materials and has for its object to simplify and improve the manufacture of such propellers.

Another object of the invention is to provide a novel and improved method of forming a thrust bearing race on the hub of a molded propeller blade during the molding operation.

Various other objects and advantages will be apparent as the nature of the invention is more fully disclosed.

The individual blades of variable pitch airplane propellers usually have thrust bearings secured on their shanks for mounting in the central hub of the propeller to permit the blades to be adjusted angularly, as is well understood in the art. The ends of the finished blade, of course, are too large to permit the bearing to be secured in place after the blade is formed, hence it is necessary to slip the bearing over the narrow shank of the blade before the shank is upset or otherwise finished to form a retaining flange for the bearing.

The present invention relates to a propeller blade of the foregoing type which is made of plastic or other moldable material, and provides a novel method of forming a thrust bearing race on the hub of such a blade during the molding operation. In the preferred embodiment of the invention the annular bearing race is slipped over the narrow shank of a partially formed plastic blade which is then placed in a suitable mold where, upon the application of heat and pressure, the blade is molded to the desired form.

The forming mold is composed of separable sections and includes an annular recess which is adapted to receive the bearing race on the shank of the partially formed propeller blade when the latter is seated in the mold. This annular recess communicates with a second annular recess of greater width but of smaller diameter adapted for the receipt of a split ring or band which surrounds the shank of the blade and effectively shields the bearing race from contact with the plastic blade material during the forming operation.

Upon the completion of the forming operation the mold is opened, and the formed blade, containing the split band surrounded by the thrust bearing race, is removed. The split band, which has served as part of the mold surface and prevented the race from adhering to the plastic blade surface during the forming operation, is readily removed from the blade and the flanged shank may then be polished or otherwise finished to provide an accurate seating surface for the bearing race.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

In the following description certain specific terms are used for convenience in referring to the various details of the invention. These terms, however, are to be interpreted as broadly as the state of the art will permit.

Figure 1:
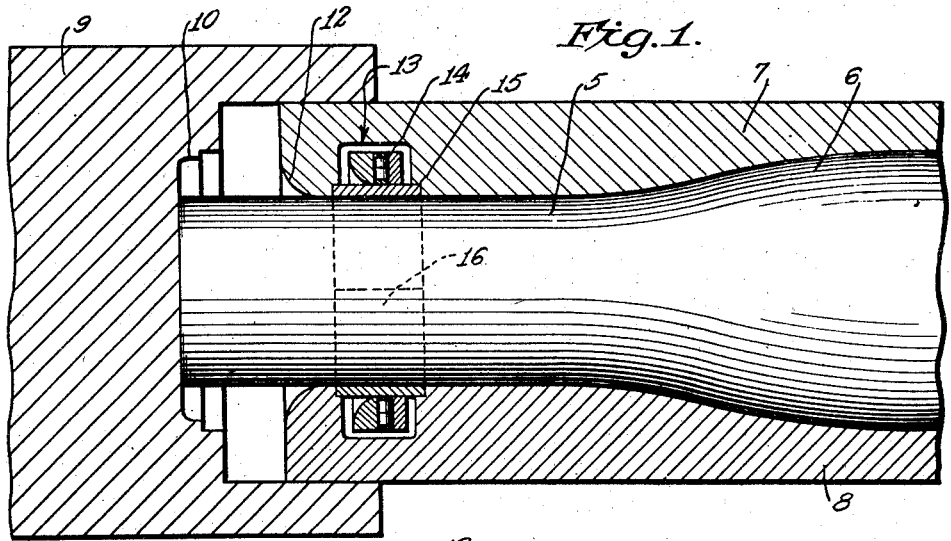
Figure 1 is a diagrammatic sectional view showing a blank propeller blade and its thrust bearing race positioned in the mold, preparatory to the forming operation.

In the drawing, Fig. 1 shows a partially formed plastic propeller blade, comprising a hollow cylindrical shank 5 and an enlarged outer blade portion 6, positioned in a mold, in readiness for the final forming operation.

The mold comprises a pair of mating mold sections 7 and 8 and a cooperating forming die 9 which telescopes over the end of the mold sections containing the shank of the partially formed propeller blank.

The forming die 9 contains internal annular recesses 10 corresponding with the shape of the flange which is to be formed on the end of the shank 5 of the propeller blade. The inner surface of mold sections 7 and 8 conforms to the desired contour of the blade, and the end portion thereof is rounded convexly at 12 in conformity with the shape of a fillet which is to be formed on the flange of the blade as hereinafter described.

The mating sections 7 and 8 of the mold are provided with an internal annular recess 13 of a width and depth adapted to loosely receive and retain the annular thrust bearing race 14 which is slipped over the shank 5 of the blade before the latter is seated in the mold. Inwardly of the recess 13, and communicating directly therewith, is a wider but shallower annular recess 15 adapted for the reception of a snug-fitting split ring or band 16 which may also be slipped over the shank 5 of the blade before the molding operation begins.

At the start of the molding operation, as shown in Fig. 1, the split band 16, properly seated in its recess 15, holds the bearing race 14 loosely within the recess 13 and effectively shields said race from contact with the shank of the plastic propeller blade. At the same time, the inner annulus of the band 16 lies flush with the adjacent inner surface of mold sections 7 and 8, so that said band, in effect, serves as part of the mold surface in contact with the shank of the plastic blade.

Figure 2:
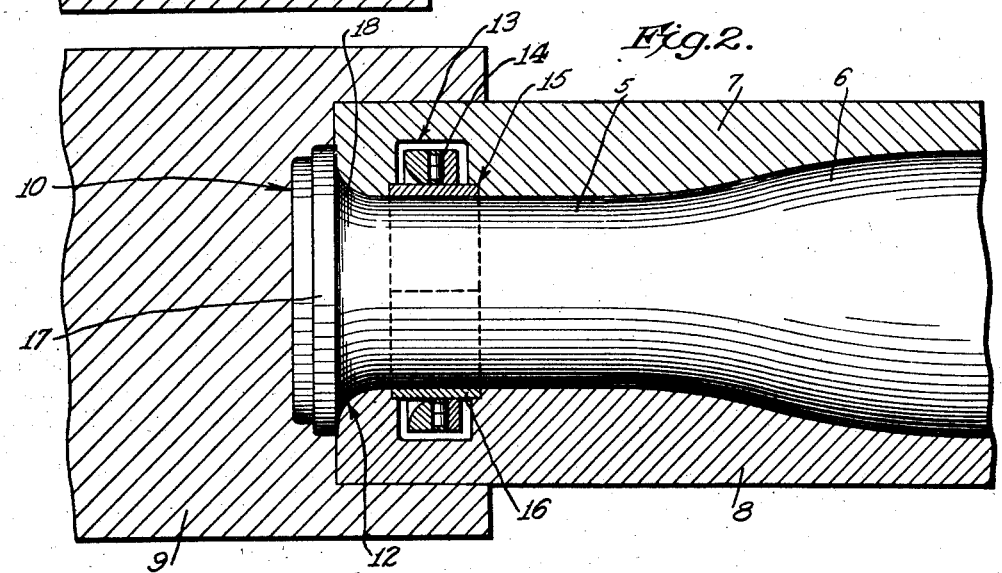
Fig. 2 is a similar view illustrating the position of the elements at the conclusion of the forming operation.
Figure 3:
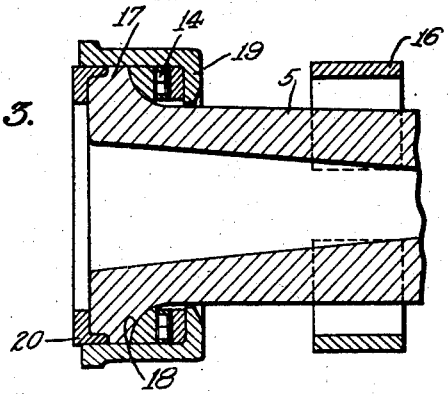
Fig. 3 is a sectional view showing the shank end of the finished blade, with the bearing race in position.

With the elements in the position shown in Fig. 1, heat is applied to the mold in a manner well understood in the art, and pressure is applied to telescope the forming die 9 over the mold to the position shown in Fig. 2, resulting in the formation of the end flange 17 and the rounded surface or fillet 18 joining same to the peripheral surface of the propeller blade as shown in Figs. 2 and 3.

The mold is now opened and the formed blade, containing the bearing race 14 as well as the split band 16, is removed. The band 16, being split, is easily sprung apart and removed from the shank of the blade as indicated in Fig. 3. Care is taken to insure the proper fit of the bearing race 14 against the curved surface 18 of the flange 17 which may be machined or polished as required. Fig. 3 shows the bearing race seated against the curved surface 18 of the flange, and against the inturned portion of a hub barrel 19 cooperating with a retaining ring 20 to secure the blade to the central hub of the propeller.

Although a specific embodiment of the invention has been shown for purposes of illustration, it will be evident that the invention is capable of various modifications and adaptations within the scope and spirit of the appended claims.

What is claimed is:

1. The method of making a propeller blade, which comprises forming a blank including a substantially cylindrical shank of moldable material, placing a multi-part shield around a part of said shank at a point spaced from the end thereof, placing a bearing about said shield, placing about said shank and said bearing a mold having a molding cavity and an additional annular cavity to accommodate said bearing, and molding the end portion of said shank in said molding cavity to form an abutment for engagement with said bearing.

2. The method in accordance with claim 1, comprising the additional steps of successively removing said mold and said shield, and moving said bearing to a point abutting said abutment molded on said shank.

3. The method in accordance with claim 1, wherein said additional annular cavity of said mold has a part conforming to and adapted closely to embrace said shield and another part adapted to enclose said bearing, whereby said shield and said mold prevent flow of any of the moldable material of said shank into contact with said bearing during the molding of the abutment portion of said shank in the molding cavity of said mold.

4. The method in accordance with claim 1, wherein said shield and the portions of said mold adjacent to said additional annular cavity are both of a size substantially to conform to the outside configuration of said shank, and wherein a part of said additional annular cavity is formed so as closely to conform to said shield, whereby when said mold is in place about said shield, the inside of said mold and of said shield form a substantially continuous surface in contact with a part of said shank spaced from that portion thereof in the molding cavity of said mold, said method comprising the additional steps of successively removing said mold and said shield, and moving said bearing to a point abutting said abutment molded on said shank.

ERLE MARTIN.

REFERENCES CITED

The following references are of record in the file of this patent:

UNITED STATES PATENTS

| Number | Name | Date |
| --- | --- | --- |
| 2,041,518 | Salz | May 19, 1936 |
| 2,318,950 | Larmour | May 11, 1943 |
| 2,335,296 | Miller | Nov. 30, 1943 |
| 2,138,370 | Caldwell | Nov. 29, 1938 |
| 1,995,451 | Handler | Mar. 26, 1936 |

FOREIGN PATENTS

| Number | Country | Date |
| --- | --- | --- |
| 452,403 | Great Britain | Aug. 21, 1936 |
| 519,399 | Great Britain | Mar. 26, 1940 |